US012799895B2

(12) United States Patent
Edwards et al.

(10) Patent No.: US 12,799,895 B2
(45) **Date of Patent: *Nov. 17, 2026**

(54) SYSTEM FOR CONTROL OF EXTERNALLY HEATED TURBINE ENGINE

(71) Applicant: Rolls-Royce North American Technologies Inc., Indianapolis, IN (US)

(72) Inventors: Daniel G. Edwards, Brownsburg, IN (US); Alexander Michalik, Indianapolis, IN (US); Andrew J. Eifert, Indianapolis, IN (US); Brian T. Spangler, Avon, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 559 days.

This patent is subject to a terminal disclaimer.

(21) Appl. No.: 18/368,803

(22) Filed: Sep. 15, 2023

(65) Prior Publication Data

US 2024/0006085 A1 Jan. 4, 2024

Related U.S. Application Data

(63) Continuation of application No. 17/170,233, filed on Feb. 8, 2021, now Pat. No. 11,776,702.

(51) Int. Cl.
*F02C 1/05* (2006.01)

(52) U.S. Cl.
CPC .................................... *F02C 1/05* (2013.01)

(58) Field of Classification Search
CPC ................ F02C 1/05; G21D 3/08; G21D 1/00
See application file for complete search history.

(56) References Cited

U.S. PATENT DOCUMENTS

| | | | | | |
|---|---|---|---|---|---|
| 3,864,919 | A * | 2/1975 | Frutschi | F02C 9/24 60/660 |
| 4,293,384 | A * | 10/1981 | Weber | G21D 9/00 376/391 |
| 4,761,957 | A * | 8/1988 | Eberhardt | F02C 1/04 60/682 |
| 4,989,552 | A * | 2/1991 | Obermayer | F01P 1/02 123/41.66 |
| 5,165,239 | A | 11/1992 | Bechtel et al. | |
| 5,267,288 | A * | 11/1993 | Frutschi | G21D 5/08 60/39.181 |

(Continued)

OTHER PUBLICATIONS

Ka At-Attab and Za Zainal, Externally Fired Gas Turbine Technology: A Review, Aug. 8, 2014, 14 pages.

(Continued)

*Primary Examiner* — Jesse S Bogue
(74) *Attorney, Agent, or Firm* — Barnes & Thornburg

(57) ABSTRACT

A power-generation system for a nuclear reactor includes a power unit, a heat exchanger, and a temperature control system. The power unit produces compressed air that is heated by the nuclear reactor via the heat exchanger. The temperature control system includes a heat transfer fluid and a heat exchanger fluidly connected with the compressed air to transfer heat between the compressed air and heat transfer fluid to control the power level of the power unit.

18 Claims, 5 Drawing Sheets

(56) References Cited

U.S. PATENT DOCUMENTS

| | | | | |
|---|---|---|---|---|
| 5,724,806 | A * | 3/1998 | Horner | F02C 7/12<br>60/806 |
| 5,799,490 | A | 9/1998 | Bronicki et al. | |
| 5,885,060 | A * | 3/1999 | Cunkelman | F04B 25/00<br>417/243 |
| 8,019,522 | B2 | 9/2011 | Coons | |
| 8,967,528 | B2 * | 3/2015 | Mackin | F02C 6/08<br>244/134 R |
| 9,388,817 | B1 * | 7/2016 | Wright | F04D 25/04 |
| 10,641,121 | B2 | 5/2020 | Skertic et al. | |
| 10,801,409 | B2 | 10/2020 | Eifert | |
| 10,851,704 | B2 * | 12/2020 | Homison | F02G 5/02 |
| 2010/0050639 | A1 | 3/2010 | Janus et al. | |
| 2010/0064688 | A1 | 3/2010 | Smith | |
| 2011/0036098 | A1 * | 2/2011 | Baten | F02C 7/185<br>415/47 |
| 2019/0017443 | A1 | 1/2019 | Eifert | |
| 2019/0024527 | A1 | 1/2019 | Skertic et al. | |
| 2020/0191048 | A1 | 6/2020 | Homison et al. | |
| 2020/0191051 | A1 * | 6/2020 | Homison | F02C 7/143 |

OTHER PUBLICATIONS

Colin F. Mcdonald and Charles R. Boland, The Nuclear Closed-Cycle Gas Turbine—Dry Cooled Commercial Power Plant Studies, Nov. 1979, https://www.osti.gov/servlets/purl/5664698, 21 pages.

International Atomic Energy Agency, Gas Turbine Power Conversion Systems for modular HTGRs, Aug. 2001, https://www-pub.iaea.org/MTCD/Publications/PDF/te_1238_prn.pdf, 216 pages.

* cited by examiner

SYSTEM FOR CONTROL OF EXTERNALLY HEATED TURBINE ENGINE

CROSS REFERENCE TO RELATED APPLICATIONS

This application claims priority to and the benefit of U.S. Provisional patent application Ser. No. 17/170,233, filed 8 Feb. 2021, the disclosure of which is now expressly incorporated herein by reference.

FIELD OF THE DISCLOSURE

The present disclosure relates generally to externally-heated turbine engines, and more specifically to control systems for externally-heated turbine engines.

BACKGROUND

Externally-heated gas turbine engines may be used to power aircraft, watercraft, and power generators. Externally-heated gas turbine engines typically include a compressor and a turbine, but utilize an external heat exchanger and heat source to raise the temperature of the working fluid within the engine. In this arrangement, it is possible for no combustion products to travel through the turbine. This may allow externally-heated gas turbine engines to burn fuels that would ordinarily damage the internal components of the engine.

The compressor compresses air drawn into the engine and produces high pressure air for the external heat source. Heat is transferred to the high pressure air from the external heat source and the heated high pressure air is directed into the turbine where work is extracted to drive the compressor and, sometimes, a generator connected to an output shaft. Combustion products from the external heat source can be exhausted in an alternative region of the externally-heated turbine engine.

SUMMARY

The present disclosure may comprise one or more of the following features and combinations thereof.

According to an aspect of the present disclosure, a power-generation system for a nuclear reactor includes a power unit, a reactor heat exchanger, and a temperature control system. The power unit includes a first generator for producing electric energy and a turbine engine coupled to and configured to drive the first generator. The turbine engine includes a compressor configured to receive and compress air to produce compressed air and a turbine configured to receive the compressed air after the compressed air is heated to extract work from the compressed air and drive the first generator. The reactor heat exchanger is in fluid communication with the compressor and the turbine and configured to transfer heat from a nuclear reactor to the compressed air to heat the compressed air during use of the power-generation system. The temperature control system regulates a temperature of the compressed air. The temperature control system includes a temperature control heat exchanger and a blower configured to provide a flow of first fluid. The temperature control heat exchanger is connected between the compressor and the turbine and is in fluid communication with both the compressed air and the blower to transfer heat between the compressed air and the flow of first fluid from the blower.

In some embodiments, the temperature control system further includes an auxiliary power unit and a mixing valve in fluid communication with the blower, the auxiliary power unit, and the temperature control heat exchange. The auxiliary power unit produces electric power and exhausts a second fluid and the mixing valve controls a flow rate of the first fluid and a flow rate of the second fluid through the mixing valve.

In some embodiments, the temperature control system includes a controller programmed to deactivate the auxiliary power unit in response to the reactor heat exchanger heating the compressed air to a threshold temperature. In some embodiments, the auxiliary power unit includes a second compressor, a combustor, and a second turbine coupled with the second compressor.

In some embodiments, the temperature control heat exchanger is fluidly connected to the turbine engine and the reactor heat exchanger downstream of the reactor heat exchanger and upstream of the turbine. In some embodiments, the temperature control system further includes a bypass duct in fluid communication with the compressed air and configured to exhaust the compressed air to atmosphere in response to the temperature of the compressed air exceeding a predetermined temperature.

In some embodiments, the temperature control system includes a controller programmed to increase the flow rate of the first fluid in response to the temperature of the compressed air received by the turbine being above a predetermined temperature. In some embodiments, the temperature control system includes an auxiliary combustor fluidly connected with the turbine and a controller programmed to deactivate the blower and activate the auxiliary combustor in response to the compressed air being below a threshold temperature.

In some embodiments, the temperature control system further includes an auxiliary power unit configured to conduct exhaust gas to the temperature control heat exchanger. The controller is programmed to activate the auxiliary combustor and the auxiliary power unit in response to an increased load demand on the first generator.

According to another aspect of the present disclosure, a power-generation system includes a power unit, a reactor heat exchanger, and a temperature control system. The power unit that includes a first generator and a turbine engine coupled to the first generator to drive the first generator. The turbine engine includes a compressor that produces compressed air and a turbine that receives the compressed air after the compressed air is heated. The reactor heat exchanger is in fluid communication with the compressor and the turbine and configured to transfer heat from a nuclear reactor to the compressed air. The temperature control system includes a temperature control heat exchanger, a blower, and a valve. The temperature control heat exchanger is connected between the compressor and the turbine. The blower is in fluid communication with a source of cooling air and the valve. The valve is in fluid communication with the temperature control heat exchanger to vary a flow rate of a cooling air from the blower through the temperature control heat exchanger to control a temperature of the compressed air received by the turbine.

In some embodiments, the temperature control system further includes an auxiliary power unit that exhausts gases. The auxiliary power unit is in fluid communication with the valve. The valve is configured to vary a flow rate of the gases from the auxiliary power unit and the flow rate of the cooling air from the blower to control the temperature of the compressed air received by the turbine.

In some embodiments, the auxiliary power unit includes a second compressor, a combustor, and a second turbine coupled with the second compressor. In some embodiments, the temperature control system further includes a bypass duct in fluid communication with the compressed air and configured to exhaust the compressed air to atmosphere in response to the temperature of the compressed air exceeding a predetermined temperature.

In some embodiments, the temperature control heat exchanger is fluidly connected to the turbine engine downstream of the reactor heat exchanger and upstream of the turbine. In some embodiments, the temperature control system includes a controller programmed to increase the flow rate of the cooling air through the valve in response to the temperature of the compressed air received by the turbine being above a predetermined temperature.

In some embodiments, the temperature control system includes a controller. The controller is programmed to deactivate the blower in response to the temperature of the compressed air received by the turbine being below a predetermined temperature.

According to another aspect of the disclosure, a method a method of operating a power-generation system is provided. The method includes compressing air with the compressor to produce the compressed air, heating the compressed air with the reactor heat exchanger that is in thermal communication with the nuclear reactor, operating the blower to provide the cooling air, transferring heat between the compressed air and the cooling air through the temperature control heat exchanger, conducting the compressed air through the turbine after transferring heat between the compressed air and the cooling air, and driving the first generator with the turbine to produce an electrical power load.

In some embodiments, the method further includes controlling a flow of the cooling air through the valve based on the temperature of the compressed air entering the turbine. In some embodiments, the method further includes deactivating the blower in response to the temperature of the compressed air being below a predetermined value. In some embodiments, the method further includes activating the blower in response to the temperature of the compressed air being above a predetermined value.

These and other features of the present disclosure will become more apparent from the following description of the illustrative embodiments.

DETAILED DESCRIPTION OF THE DRAWINGS

Figure 1:
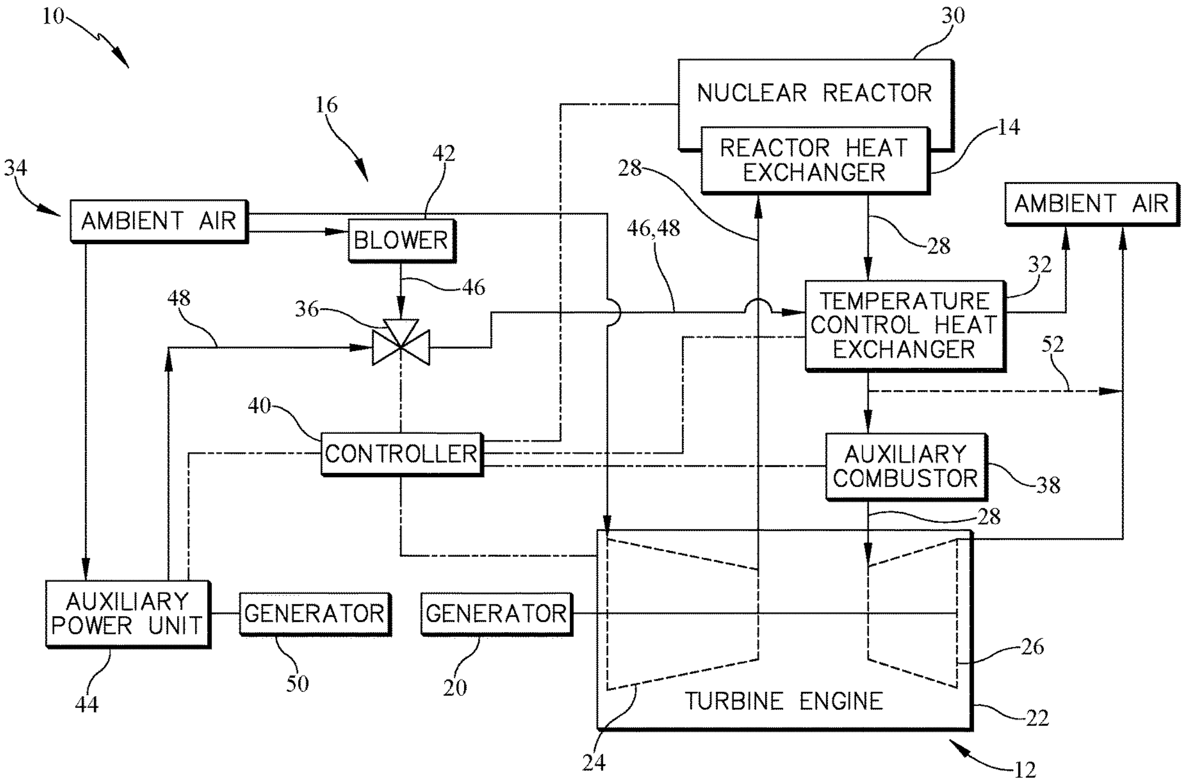
FIG. 1 is a diagrammatic view of a power-generation system according the present disclosure, the system uses heat from a nuclear reactor to run a turbine engine which, in turn, drives a generator to produce electric energy, the system further includes a temperature control system having a blower that provides ambient air, an auxiliary power unit that provides exhaust air, a mixing valve that combines and adjusts the flow rate of the ambient air and exhaust air, and a temperature control heat exchanger fluidly connected with the mixing valve and the power unit to control the temperature of compressed air entering the turbine during normal operation of the power unit.

For the purposes of promoting an understanding of the principles of the disclosure, reference will now be made to a number of illustrative embodiments illustrated in the drawings and specific language will be used to describe the same.

An illustrative power-generation system 10 includes a power unit 12, a reactor heat exchanger 14, and a temperature control system 16 as shown in FIG. 1. The power unit 12 includes a turbine engine 22 having a compressor 24 and a turbine 26 fluidly connected to the reactor heat exchanger 14. The reactor heat exchanger 14 is located external to the turbine engine 22 and transfers heat to compressed air 28 provided by the compressor 24. The heated compressed air 28 is delivered to the turbine 26 so that the turbine 26 can extract power from the heated compressed air 28 and drive a generator 20 to produce electric power for a facility, for example.

The temperature control system 16 includes a temperature control heat exchanger 32 fluidly connected with the compressor 24 so that it can increase or decrease the temperature of the compressed air 28 delivered to the turbine 26 to be within a predetermined range. The temperature control system 16 further includes a controller 40 and a fluid source 34 that may provide a first fluid 46 from a blower 42 and/or a second fluid 48 from an auxiliary power unit 44. In other embodiments, the fluid source 34 may be a canister of air or gas, a tank or supply of liquid, or other suitable alternative for providing cooling fluid. The controller 40 can individually and selectively vary the flow rate of the first fluid 46 and the second fluid 48 received by the temperature control heat exchanger 32. The varying flow rate of the fluids 46, 48 allows the controller to regulate the heat transferred between the compressed air 28 and the first and second fluids 46, 48 so that the system can respond to different power loads demanded by the power unit 12.

The power unit 12 includes a first generator 20 and the turbine engine 22 as shown in FIG. 1. The turbine engine 22 includes the compressor 24 and the turbine 26. The compressor 24 and the first generator 20 are mechanically coupled to the turbine 26 and powered by the turbine 26. Ambient air is delivered to the compressor 24 which produces compressed air 28. The turbine 26 receives the compressed air 28 after the compressed air 28 is heated by the reactor heat exchanger 14. The heated compressed air 28 drives the turbine 26 to produce power that drives the compressor 24 and the first generator 20.

The first generator 20 produces an electrical power load that may power an auxiliary device such as a building, aircraft, or provide additional electricity to an electrical grid. During operation of the power-generation system 10, a load demand of electrical power on the first generator 20 may vary such that the turbine 26 may need to provide more or less power to drive the first generator 20 to meet the load demand.

The reactor heat exchanger 14 is fluidly coupled with the compressor 24 and the turbine 26 and located external to the turbine engine 22 as shown in FIG. 1. The reactor heat exchanger 14 transfers heat to the compressed air 28 provided by the compressor 24, and delivers heated compressed air to the turbine 26. In the illustrative embodiment, the reactor heat exchanger 14 is fluidly coupled with a nuclear reactor 30 to transfer heat from the nuclear reactor 30 to the compressed air 28. In the illustrative embodiment, the reactor heat exchanger 14 is a gas-to-gas heat exchanger and have heated nitrogen gas supplied to it on the nuclear reactor side.

The nuclear reactor 30 may be slow to initially generate and transfer heat through the reactor heat exchanger 14 and to the compressed air 28 in the startup mode. As such, other heat sources such as an auxiliary power unit and/or an auxiliary combustor 38 may be used to supplement the nuclear reactor heat during the startup mode.

During steady operation of the power-generation system 10, the nuclear reactor 30 provides generally constant heat that is transferred to the compressed air 28 via the reactor heat exchanger 14. The nuclear reactor 30 may be able to adjust its heat output, however, at a slow rate compared to the rate desired by the turbine engine 22. As such, if the load demand on the first generator 20 changes, the nuclear reactor heat may not be able to respond quickly enough. The blower 42 may supply cool air to cool the compressed air 28 relatively quickly so that the work extracted by the turbine 26 matches the demand on the first generator 20. In other embodiments, the reactor heat exchanger 14 may be fluidly coupled with another heat source to provide heat to the compressed air 28.

The temperature control system 16 regulates the temperature of the compressed air 28 received by the turbine 26 so that the turbine 26 can produce power to meet a load demand on the first generator 20 or to operate the turbine engine 22 at an idle speed. The temperature control system 16 includes a temperature control heat exchanger 32, a fluid source 34, a mixing valve 36, and a controller 40 as shown in FIG. 1. In the illustrative embodiment, the temperature control system 16 further includes an optional auxiliary combustor 38 that mixes fuel with the compressed air 28 to rapidly heat up the compressed air 28 prior to the compressed air 28 entering the turbine 26.

The temperature control system 16 regulates the temperature of the compressed air 28 received by the turbine 26 within a predetermined range that allows the turbine 26 to produce power to meet a load demand on the first generator 20. If the temperature of the compressed air 28 is above the predetermined range, the turbine 26 produces surplus power and drives the first generator to produce surplus electrical power above the load demand. If the temperature of the compressed air 28 is below the predetermined range, the turbine 26 may extract insufficient work from the compressed air 28 to meet the load demand on the first generator 20.

The temperature control system 16 also regulates the temperature of the compressed air 28 received by the turbine 26 to be at least at a threshold temperature. The threshold temperature of the compressed air 28 allows the turbine 26 to extract sufficient work from the compressed air 28 to operate the compressor 24 and the first generator 20 at an idle speed. If the compressed air 28 is below the threshold temperature, the turbine 26 may extract insufficient work from the compressed air 28 so that the turbine 26 cannot operate the compressor 24 and the first generator 20 at the idle speed without support from the temperature control system 16.

The temperature control heat exchanger 32 is fluidly coupled to the fluid source 34 via the mixing valve 36 to provide a flow of a fluid 46, 48 to the temperature control heat exchanger 32 as shown in FIG. 1. The temperature control heat exchanger 32 is connected to and located between the reactor heat exchanger 14 and the turbine 26 as shown in FIG. 1. The temperature control heat exchanger 32 is fluidly connected to the compressed air 28 and the first and second fluids 46, 48 and transfers heat therebetween.

In the illustrative embodiment of FIG. 1, the fluid source 34 includes a blower 42 and an auxiliary power unit 44. The blower 42 receives ambient air and provides a flow of a first fluid 46 (ambient air) at a first temperature to the temperature control heat exchanger 32. The first fluid 46 extracts heat from the compressed air 28 when the first fluid 46 passes through the temperature control heat exchanger 32.

The auxiliary power unit 44 exhausts a second fluid 48 at a second temperature that flows to the temperature control heat exchanger 32. Illustratively, the second fluid is exhaust gases from an engine included in the auxiliary power unit 44. The first temperature of the first fluid 46 is less than the second temperature of the second fluid 48. The second fluid 48 transfers heat to the compressed air 28 when the second fluid 48 passes through the temperature control heat exchanger 32. The auxiliary power unit 44 further includes a second generator 50 to provide electrical power to the power-generation system 10 for example at the startup mode of the system 10.

In some embodiments, the auxiliary power unit 44 is a turbine engine having a compressor, combustor, and turbine. The compressor of the auxiliary power unit 44 receives and compresses ambient air and the combustor mixes the compressed ambient air with fuel and ignites the mixture. Work is extracted from the ignited mixture by the turbine of the auxiliary power unit 44, and the turbine is coupled with the second generator 50 to produce electrical power. In other embodiments, the second generator 50 is smaller (less kW) than the first generator 20 and provides sufficient electrical power for the components of the power-generation system 10 and does not output additional electrical power to auxiliary units or accessories.

The mixing valve 36 is fluidly coupled to the blower 42, the auxiliary power unit 44, and the temperature control heat exchanger 32 as shown in FIG. 1. The first fluid 46 and the second fluid 48 flow through the mixing valve 36 and the mixing valve 36 regulates the flow rate of the first fluid 46 and/or the second fluid 48 provided to the temperature control heat exchanger 32. The mixing valve 36 can be configured to allow only the first fluid 46 to pass through the mixing valve 36, only the second fluid 48 to pass through the mixing valve 36, or a mixture of the first fluid 46 and the second fluid 48 through the mixing valve 36. The flow rate of each of the first fluid 46 and the second fluid 48 may be individually and selectively adjusted.

In the illustrative embodiment, the temperature control system 16 further includes a bypass duct 52 that exhausts compressed air 28 exiting the temperature control heat exchanger 32 away from the turbine 26 and into ambient air as shown in FIG. 1. The bypass duct 52 can be optionally used if the temperature of the compressed air 28 exiting the temperature control heat exchanger 32 is hot enough to cause damage to the turbine 26 or exceeds the predetermined temperature range for a given load demand on the first generator 20.

The controller 40 is connected to the turbine engine 22, the nuclear reactor 30, temperature control heat exchanger 32, the mixing valve 36, the auxiliary combustor 38, and the auxiliary power unit 44 in the illustrative embodiment as shown in FIGS. 1-4. The controller 40 selectively operates each of the elements of the power-generation system 10 in response to a mode of the power-generation system 10, a temperature of the compressed air 28 at the inlet of the turbine 26, and/or a load demand of the first generator 20. The controller 40 may activate, deactivate, or vary the power level of any of the turbine engine 22, the nuclear reactor 30, the auxiliary combustor 38, or the auxiliary power unit 44.

The controller 40 may selectively operate the mixing valve 36 in multiple different configurations to regulate the amount of the first fluid 46 and the second fluid 48 in the mixture that is provided to the temperature control heat exchanger 32 as shown in FIG. 1. The controller 40 may further selectively operate the mixing valve 36 to vary the flow rate of the first fluid 46, the second fluid 48, or the mixture of the first and second fluids 46, 48 provided to the temperature control heat exchanger 32. The controller 40 may also close the mixing valve 36 so that one or both of the first fluid 46 and the second fluid 48 are not provided to the temperature control heat exchanger 32 as shown in FIG. 4.

Figure 2:
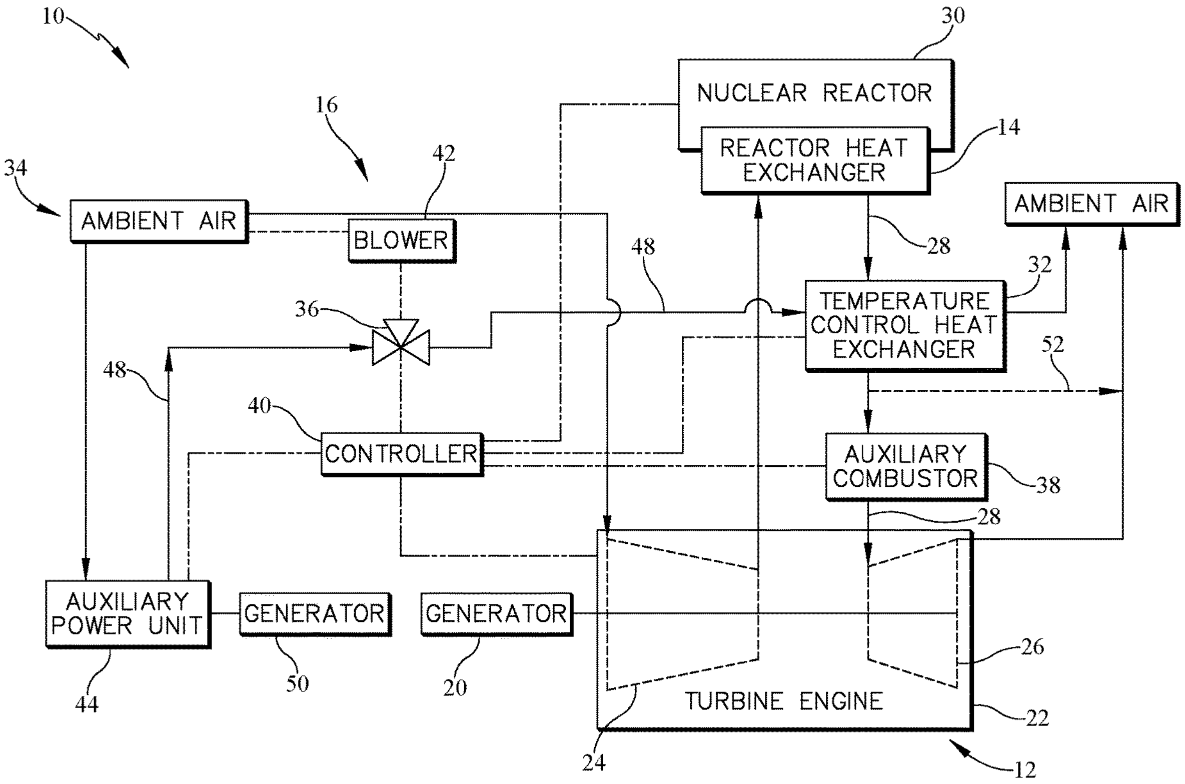
FIG. 2 is a diagrammatic view showing the system of FIG. 1 and suggesting that the blower is deactivated and does not supply ambient air to the temperature control heat exchanger and the auxiliary power unit is activated and provides exhaust air to the temperature control heat exchanger in response to the nuclear reactor supplying insufficient heat to the turbine engine at a startup mode of the nuclear reactor.

In the illustrative embodiment shown in FIG. 2, the controller 40 is operating the power-generation system 10 in a startup mode. In the startup mode, the reactor 30 is not operating at steady state and the reactor heat exchanger 14 may transfer insufficient heat to the compressed air 28 so that the turbine 26 is unable to power the turbine engine 22 at an idle speed. In the startup mode, the controller 40 activates the auxiliary power unit 44 to power the system 10 and also so that the hot exhaust second fluid 48 is provided to the temperature control heat exchanger 32 and transfers heat to the compressed air 28. The controller 40 also operates the mixing valve 36 so that the second fluid 48 is provided to the temperature control heat exchanger 32, and the first fluid 46 from the blower 42 is blocked from flowing to the temperature control heat exchanger 32. The controller 40 may maintain the configuration as shown in FIG. 2 until the reactor heat exchanger 14 heats the compressed air 28 to a threshold temperature, and the turbine can provide power to operate the turbine engine 22 and the first generator 20.

Figure 4:
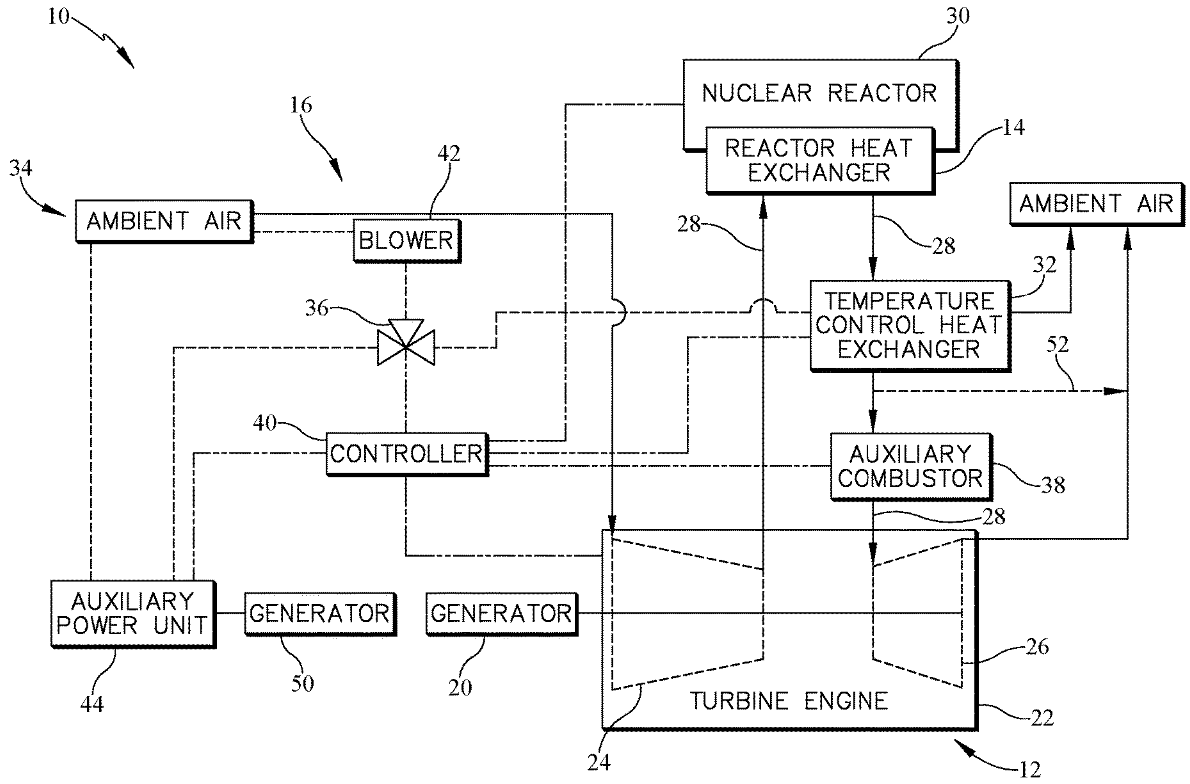
FIG. 4 is a diagrammatic view showing the system of FIG. 1 and suggesting that the auxiliary power unit and the blower are deactivated and an auxiliary combustor connected to the temperature control heat exchanger and the power unit is activated to transfer heat to the compressed air entering the turbine after the startup mode in which the auxiliary power unit may be deactivated.

In the illustrative embodiment shown in FIG. 4, a running mode may follow the startup mode and the controller 40 deactivates the auxiliary power unit 44 in response to the reactor heat exchanger 14 heating the compressed air 28 to a threshold temperature so that the turbine 26 produces sufficient power to operate the compressor 24 and the first generator 20. The controller 40 may further operate the mixing valve 36 in a closed configuration in response to the temperature of the compressed air at the inlet of the turbine 26 falling within the predetermined range so that the first fluid 46 and the second fluid 48 are blocked from flowing to the temperature control heat exchanger 32, and no heat is transferred to or from the compressed air 28 from the heat exchanger 32.

In another embodiment, the controller 40 configuration shown in FIG. 2 is used to increase the temperature of the compressed air 28 when the power-generation system 10 is in a power-increase mode and there is an increased load demand from the first generator 20. In this configuration, the controller 40 activates the auxiliary power unit 44 and operates the mixing valve 36 to allow the second fluid 48 to flow to the temperature control heat exchanger 32 so that additional heat is transferred to the compressed air 28 and the turbine 26 extracts additional work from the heated compressed air 28. The controller 40 may also activate the auxiliary combustor 38 to transfer more heat to the compressed air 28 so that more work can be extracted from the hot compressed air 28 by the turbine 26. Alternatively, the controller 40 deactivates the auxiliary power unit 44 and activates the auxiliary combustor 38 to transfer additional heat to the compressed air 28 in the power-increase mode as shown in FIG. 4.

Figure 3:
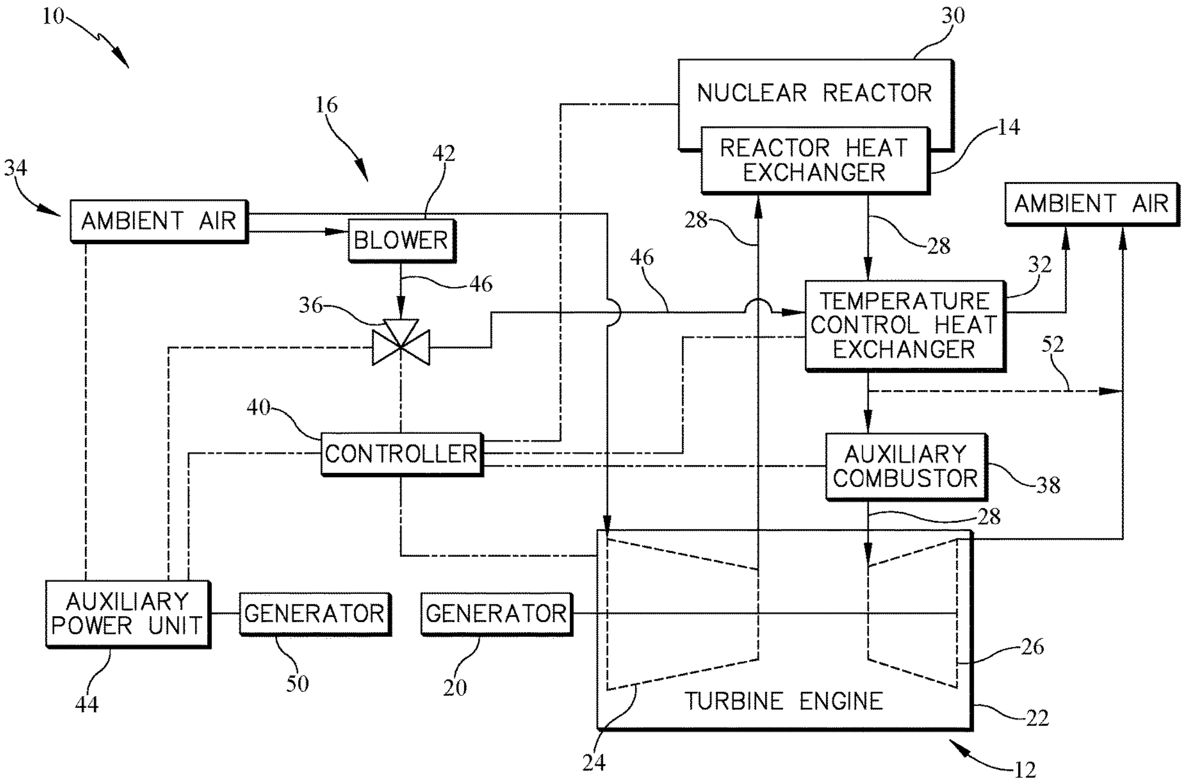
FIG. 3 is a diagrammatic view showing the system of FIG. 1 and suggesting that the auxiliary power unit is deactivated and does not supply exhaust air to the temperature control heat exchanger and the blower is activated and supplies ambient air to the temperature control heat exchanger to regulate the temperature of compressed air entering the turbine in response to the nuclear reactor supplying an excess amount of heat to the turbine engine for a given load on the generator.

In the illustrative embodiment of FIG. 3, the controller 40 is operating the power-generation system 10 in a power-decrease mode and there is a relatively quick reduced load demand on the first generator 20. As an example, the load on the first generator 20 may change in response to less electrical power being used by the building or equipment connected to the first generator 20. In this configuration, the controller 40 deactivates the auxiliary power unit 44 and operates the mixing valve 36 so that the first fluid 46 from the blower 42 is provided to the temperature control heat exchanger 32. The first fluid 46 extracts heat from the compressed air 28 through the temperature control heat exchanger 32 so that the turbine 26 extracts less power from the compressed air 28 and decreases the power provided to the first generator 20.

In another embodiment, the controller 40 maintains operation of the power-generation system 10 in the running mode as shown in FIG. 3. The controller 40 selectively operates the mixing valve 36 to provide a flow rate of the first fluid 46 that the extracts heat from the compressed air 28 through the temperature control heat exchanger 32. In the running mode, the controller 40 monitors the temperature of the compressed air 28 at the inlet of the turbine 26, and varies the flow rate of the first fluid 46 so that the temperature of the compressed air 28 does not exceed a turbine critical temperature or the predetermined range.

In a further embodiment, the controller 40 maintains operation or the power-generation system 10 in the running mode as shown in FIG. 1. In this configuration, the controller 40 activates the auxiliary power unit 44 and operates the mixing valve 36 to provide a mixture of the first fluid 46 and the second fluid 48 to the temperature control heat exchanger 32 to maintain the temperature of the compressed air 28 in the predetermined range. The controller 40 varies the mixing valve 36 to increase the flow rate of the first fluid 46 relative to the second fluid 48 in response to the temperature of compressed air 28 exceeding the predetermined range. The controller 40 varies the mixing valve 36 to increase the flow rate of the second fluid 48 relative to the first fluid 46 in response to the temperature of compressed air 28 falling below the predetermined range.

Figure 5:
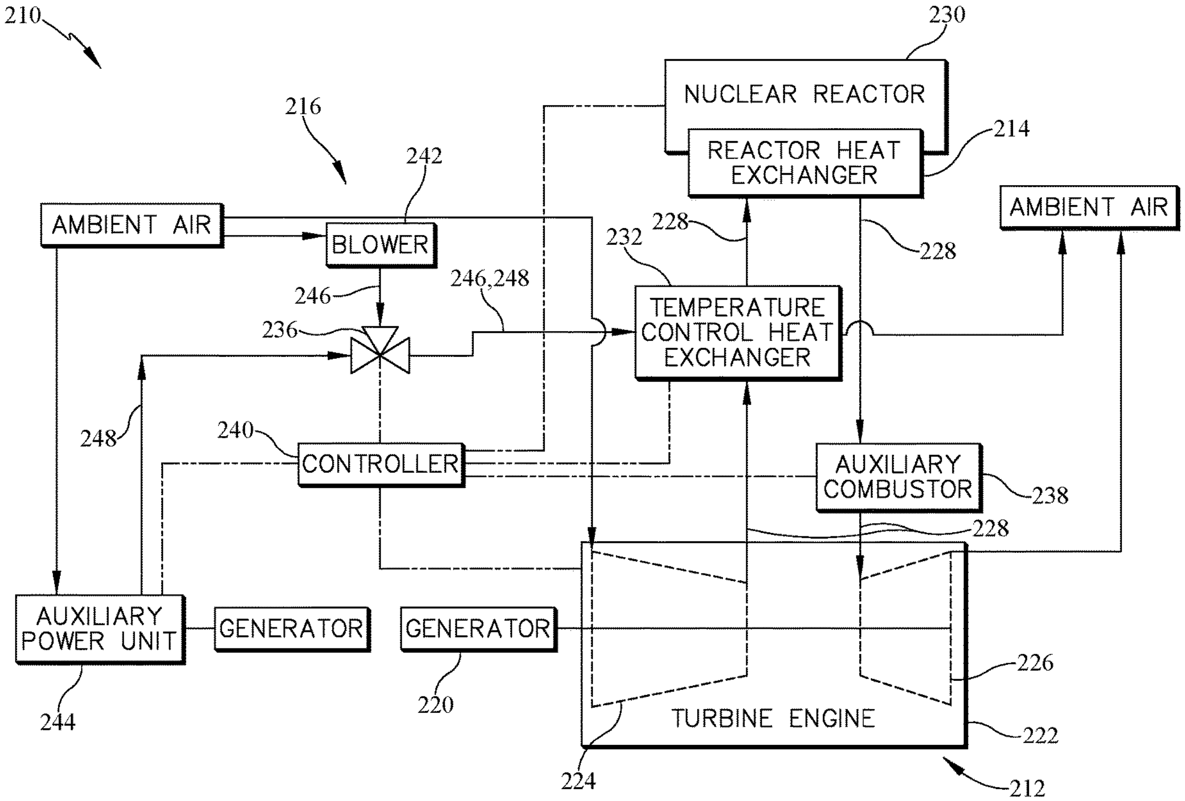
FIG. 5 is another diagrammatic view of a power-generation system including a generator coupled to the power unit, a nuclear reactor thermally coupled to a compressor and a turbine of the power unit, and a temperature control system having a blower, an auxiliary power unit, a mixing valve that combines and adjusts the flow rate of air from the blower and the auxiliary power unit, and a temperature control heat exchanger coupled to the mixing valve, and the temperature control heat exchanger is fluidly connected to the power unit between the compressor and the nuclear reactor heat exchanger.

Another embodiment of a power-generation system 210 in accordance with the present disclosure is shown in FIG. 5. The power-generation system 210 is substantially similar to the power-generation system 10 shown in FIGS. 1-4 and described herein. Accordingly, similar reference numbers in the 200 series indicate features that are common between the power-generation system 210 and the power-generation system 10. The description of the power-generation system 10 is incorporated by reference to apply to the power-generation system 210, except in instances when it conflicts with the specific description and the drawings of the power-generation system 210.

The power unit 212 includes a generator 220 and a turbine engine 222 as shown in FIG. 5. The turbine engine 222 includes a compressor 224 and a turbine 226. The reactor heat exchanger 214 is fluidly coupled with the compressor 224 and the turbine 226 and located external to the turbine engine 222. The reactor heat exchanger 214 transfers heat to compressed air 228 provided by the compressor 224, and delivers heated compressed air 228 to the turbine 226. In the illustrative embodiment, the reactor heat exchanger 214 is fluidly coupled with a nuclear reactor 230 to transfer heat from the nuclear reactor 230 to the compressed air 228.

The temperature control system 216 regulates the temperature of the compressed air 228 received by the turbine 226 within a predetermined range that allows the turbine 226 to produce power to meet a load demand on the generator 220. The temperature control system 216 includes a temperature control heat exchanger 232, a blower 242, an auxiliary power unit 244, a mixing valve 236, and a controller 240 as shown in FIG. 5. In the illustrative embodiment, the temperature control system 216 further includes an auxiliary combustor 238 that mixes fuel with the compressed air 228 to rapidly heat up the compressed air 228 prior to the compressed air 228 entering the turbine 226.

The temperature control heat exchanger 232 is fluidly coupled to the blower 242 and the auxiliary power unit 244 via the mixing valve 236 to provide a flow of a first fluid 246 and a second fluid 248 respectively to the temperature control heat exchanger 232. The temperature control heat exchanger 232 is connected to and located between the compressor 224 and the reactor heat exchanger 214. The temperature control heat exchanger 232 is fluidly connected to the compressed air 228 and the first and second fluids 246, 248 and transfers heat therebetween.

The present disclosure may provide a manner for rapidly adjusting the output of an externally-heated gas turbine engine. Externally-heated gas turbine engines have been explored and developed for use in the power-generation market, but for most of these applications, the external-heated system may be easily adjusted by controlling the amount of fuel combusted. In some applications, such as nuclear fueled, the amount of heat produced may not be quickly adjusted to accommodate load changes of the power-generation system.

The power-generation system 10 as shown in FIG. 1 includes a blower 42 and temperature control heat exchanger 32 to modulate the temperature of the air 28 entering the turbine 26. A range of air flows may be passed through the temperature control heat exchanger 32 to adjust the temperature of the air 28 entering the turbine 26. This may allow the compressor 24 and turbine 26 to maintain a constant mass flow rate, but have the turbine inlet temperature adjusted to match a power demand. This may allow the system to operate similar to direct fired gas turbine engine, with the combusted fuel flow adjusted to match the power demand.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A power-generation system for a nuclear reactor, the power-generation system comprising:

a power unit that includes a first generator for producing electric energy and a turbine engine coupled to and configured to drive the first generator, the turbine engine includes a compressor configured to receive and compress air to produce compressed air and a turbine configured to receive the compressed air after the compressed air is heated to extract work from the compressed air and drive the first generator, a reactor heat exchanger in fluid communication with the compressor and the turbine and configured to transfer heat from a nuclear reactor to the compressed air to heat the compressed air during use of the power-generation system, and a temperature control system configured to regulate a temperature of the compressed air, the temperature control system including a temperature control heat exchanger and a blower configured to provide a flow of first fluid, the temperature control heat exchanger connected between the compressor and the turbine and in fluid communication with both the compressed air and the blower to transfer heat between the compressed air and the flow of first fluid from the blower, wherein the temperature control system further includes an auxiliary power unit and a mixing valve in fluid communication with the blower, the auxiliary power unit, and the temperature control heat exchanger, wherein the auxiliary power unit is configured to produce electric power and exhaust a second fluid, and the mixing valve is configured to control a flow rate of the first fluid and a flow rate of the second fluid through the mixing valve.

2. The power-generation system of claim 1, wherein the temperature control system includes a controller programmed to deactivate the auxiliary power unit in response to the reactor heat exchanger heating the compressed air to a threshold temperature.

3. The power-generation system of claim 1, wherein the auxiliary power unit includes a second compressor, a combustor, and a second turbine coupled with the second compressor.

4. The power-generation system of claim 1, wherein the temperature control system further includes a bypass duct in fluid communication with the compressed air and configured to exhaust the compressed air to atmosphere in response to the temperature of the compressed air exceeding a predetermined temperature.

5. The power-generation system of claim 1, wherein the temperature control system includes a controller programmed to increase the flow rate of the first fluid in response to the temperature of the compressed air received by the turbine being above a predetermined temperature.

6. The power-generation system of claim 1, wherein the temperature control system includes an auxiliary combustor fluidly connected with the turbine and a controller programmed to deactivate the blower and activate the auxiliary combustor in response to the compressed air being below a threshold temperature.

7. The power-generation system of claim 6, wherein the temperature control system further includes an auxiliary power unit configured to conduct exhaust gas to the temperature control heat exchanger and wherein the controller is programmed to activate the auxiliary combustor and the auxiliary power unit in response to an increased load demand on the first generator.

8. A power-generation system for a nuclear reactor, the power-generation system comprising:

a power unit that includes a first generator for producing electric energy and a turbine engine coupled to and configured to drive the first generator, the turbine engine includes a compressor configured to receive and compress air to produce compressed air and a turbine configured to receive the compressed air after the compressed air is heated to extract work from the compressed air and drive the first generator, a reactor heat exchanger in fluid communication with the compressor and the turbine and configured to transfer heat from a nuclear reactor to the compressed air to heat the compressed air during use of the power-generation system, and a temperature control system configured to regulate a temperature of the compressed air, the temperature control system including a temperature control heat exchanger and a blower configured to provide a flow of first fluid, the temperature control heat exchanger connected between the compressor and the turbine and in fluid communication with both the compressed air and the blower to transfer heat between the compressed air and the flow of first fluid from the blower, wherein the temperature control heat exchanger is fluidly connected to the turbine engine and the reactor heat exchanger downstream of the reactor heat exchanger and upstream of the turbine.

9. A power-generation system comprising:

a power unit that includes a first generator and a turbine engine coupled to the first generator and configured to drive the first generator, the turbine engine includes a compressor that produces compressed air and a turbine that receives the compressed air after the compressed air is heated, a reactor heat exchanger in fluid communication with the compressor and the turbine and configured to transfer heat from a nuclear reactor to the compressed air, and a temperature control system that includes a temperature control heat exchanger, a blower, and a valve, the temperature control heat exchanger connected between the compressor and the turbine, the blower is in fluid communication with a source of cooling air and the valve, and the valve is in fluid communication with the temperature control heat exchanger to vary a flow rate of a cooling air from the blower through the temperature control heat exchanger to control a temperature of the compressed air received by the turbine, wherein the temperature control system further includes an auxiliary power unit that exhausts gases, the auxiliary power unit is in fluid communication with the valve, and the valve is configured to vary a flow rate of the gases from the auxiliary power unit and the flow rate of the cooling air from the blower to control the temperature of the compressed air received by the turbine.

10. The power-generation system of claim 9, wherein the auxiliary power unit includes a second compressor, a combustor, and a second turbine coupled with the second compressor.

11. The power-generation system of claim 9, wherein the temperature control system further includes a bypass duct in fluid communication with the compressed air and configured to exhaust the compressed air to atmosphere in response to the temperature of the compressed air exceeding a predetermined temperature.

12. The power-generation system of claim 9, wherein the temperature control heat exchanger is fluidly connected to the turbine engine downstream of the reactor heat exchanger and upstream of the turbine.

13. The power-generation system of claim 9, wherein the temperature control system includes a controller programmed to increase the flow rate of the cooling air through the valve in response to the temperature of the compressed air received by the turbine being above a predetermined temperature.

14. The power-generation system of claim 9, wherein the temperature control system includes a controller programmed to deactivate the blower in response to the temperature of the compressed air received by the turbine being below a predetermined temperature.

15. A method of operating the power-generation system of claim 10, the method comprising:

compressing air with the compressor to produce the compressed air, heating the compressed air with the reactor heat exchanger that is in thermal communication with the nuclear reactor, operating the blower to provide the cooling air, transferring heat between the compressed air and the cooling air through the temperature control heat exchanger, conducting the compressed air through the turbine after transferring heat between the compressed air and the cooling air, and driving the first generator with the turbine to produce an electrical power load.

16. The method of claim 15, further including controlling a flow of the cooling air through the valve based on the temperature of the compressed air entering the turbine.

17. The method of claim 15, further comprising deactivating the blower in response to the temperature of the compressed air being below a predetermined value.

18. The method of claim 15, further comprising activating the blower in response to the temperature of the compressed air being above a predetermined value.

* * * * *